(12) United States Patent
Josh et al.

(10) Patent No.: US 10,637,989 B1
(45) Date of Patent: Apr. 28, 2020

(54) SYSTEM AND METHOD FOR IMPROVING EFFICIENCY OF COMMUNICATION SESSIONS AT A CALL CENTER

(71) Applicant: LIGHTICO LTD., Tel Aviv (IL)

(72) Inventors: Justin Josh, Oranit (IL); Avraham Lousky, Hod Hasharon (IL); Zvi Ben Ishay, Rishon Lezion (IL); Shlomi Levi, Kfar Saba (IL)

(73) Assignee: LIGHTICO LTD., Tel-Aviv (IL)

( * ) Notice: Subject to any disclaimer, the term of this patent is extended or adjusted under 35 U.S.C. 154(b) by 0 days.

(21) Appl. No.: 16/672,556

(22) Filed: Nov. 4, 2019

(51) Int. Cl.
*H04M 3/51* (2006.01)

(52) U.S. Cl.
CPC ....... *H04M 3/5191* (2013.01); *H04M 3/5175* (2013.01)

(58) Field of Classification Search
CPC ............. H04M 3/5191; H04M 3/5175; H04M 3/5183; H04M 7/0027
USPC ............ 379/265.09, 265.01, 265.05, 265.06, 379/265.07, 265.11
See application file for complete search history.

(56) References Cited

U.S. PATENT DOCUMENTS 9,894,201 B1 * 2/2018 Matula ................ H04M 3/5141
10,425,363 B2 * 9/2019 Skiba ..................... H04L 51/02

\* cited by examiner

*Primary Examiner* — Thjuan K Addy
(74) *Attorney, Agent, or Firm* — Alphapatent Associates, Ltd; Daniel J. Swirsky

(57) ABSTRACT

A method for conducting a communication session between a personal electronic device and a system operated by a call center agent, including establishing a communication session between the system and the personal electronic device, exchanging information between the system and the personal electronic device according to a workflow stored in the system, sending visual content from the server to the personal electronic device, the visual content is associated with a step in the workflow, receiving a feedback confirmation from the personal electronic device, the feedback confirmation defines a feedback detected at the personal electronic device regarding the visual content and advancing to a subsequent step in the workflow based on the feedback confirmation.

12 Claims, 5 Drawing Sheets

SYSTEM AND METHOD FOR IMPROVING EFFICIENCY OF COMMUNICATION SESSIONS AT A CALL CENTER

FIELD

The invention relates to improving efficiency of communication sessions at a call center.

BACKGROUND

Call centers are service units of commercial businesses designed and aimed to provide services to customers and potential customers over communication channels. The services may include sales, change of service programs, technical support, educating customers, and additional tasks. The services may be provided by automated machines or agent, which are employees of contractors of the commercial business. The communication session with the customer may be performed over an audio conversation, video conversation, text, and a combination of the above. Many call centers are the main contact interface for customers, as well as physical stores. The main difference is that the call centers require less rent fees and can be placed in a remote location, sometimes even in a different country.

The agents communicating with the customers are expected to provide services to the customers rather fast, and the commercial business measures the agents' performance in terms of number of calls per hour or day, as well as the level of customer satisfaction resulted from the communication session. More successful sessions are likely to result in higher salary for the agents. In addition to customer satisfaction, the agents are also expected to sell services to the customer they talk with, such as new devices, new services, additional or more expensive billing programs, and the like. The agents often work according to scripts designed to make the communication sessions shorter while improving the chances of selling to the customer during the communication session.

SUMMARY

In one aspect of the invention a method is provided for conducting a communication session between a personal electronic device and a system operated by a call center agent, comprising establishing a communication session between the system and the personal electronic device, exchanging information between the system and the personal electronic device according to a workflow stored in the system, sending visual content from the server to the personal electronic device, said visual content is associated with a step in the workflow, receiving a feedback confirmation from the personal electronic device, said feedback confirmation defines a feedback detected at the personal electronic device regarding the visual content and advancing to a subsequent step in the workflow based on the feedback confirmation.

In some cases, advancing to a subsequent step comprises changing a data field definition in the system. In some cases, the visual content comprises text and the feedback confirmation comprises reading confirmation of at least a predefined portion of the text.

In some cases, sending the visual content to an address defined by a user of the personal electronic device. In some cases, the visual content comprises a text message displayed on a messaging application installed in the personal electronic device. In some cases, the visual content comprises an image opened in response to an action performed by a user of the personal electronic device. In some cases, the method further comprises sending an internet link to the personal electronic device along with the visual content. In some cases, the feedback confirmation is inputted by a user of the personal electronic device into the internet link.

In some cases, the feedback confirmation is identification of the personal electronic device accessing the internet link. In some cases, the method further comprises terminating the communication session between the system and the personal electronic device and storing a specific step in the workflow in which the communication session was terminated and resuming another communication session between the system and the personal electronic device in the specific step. In some cases, the method further comprises generating an instance of the workflow assigned for the communication session between the system and the personal electronic device. In some cases, the method further comprises collecting information relevant to the workflow during the session and selecting an execution path from multiple paths of the workflow according to the collected information and a set of rules.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

Figure 1:
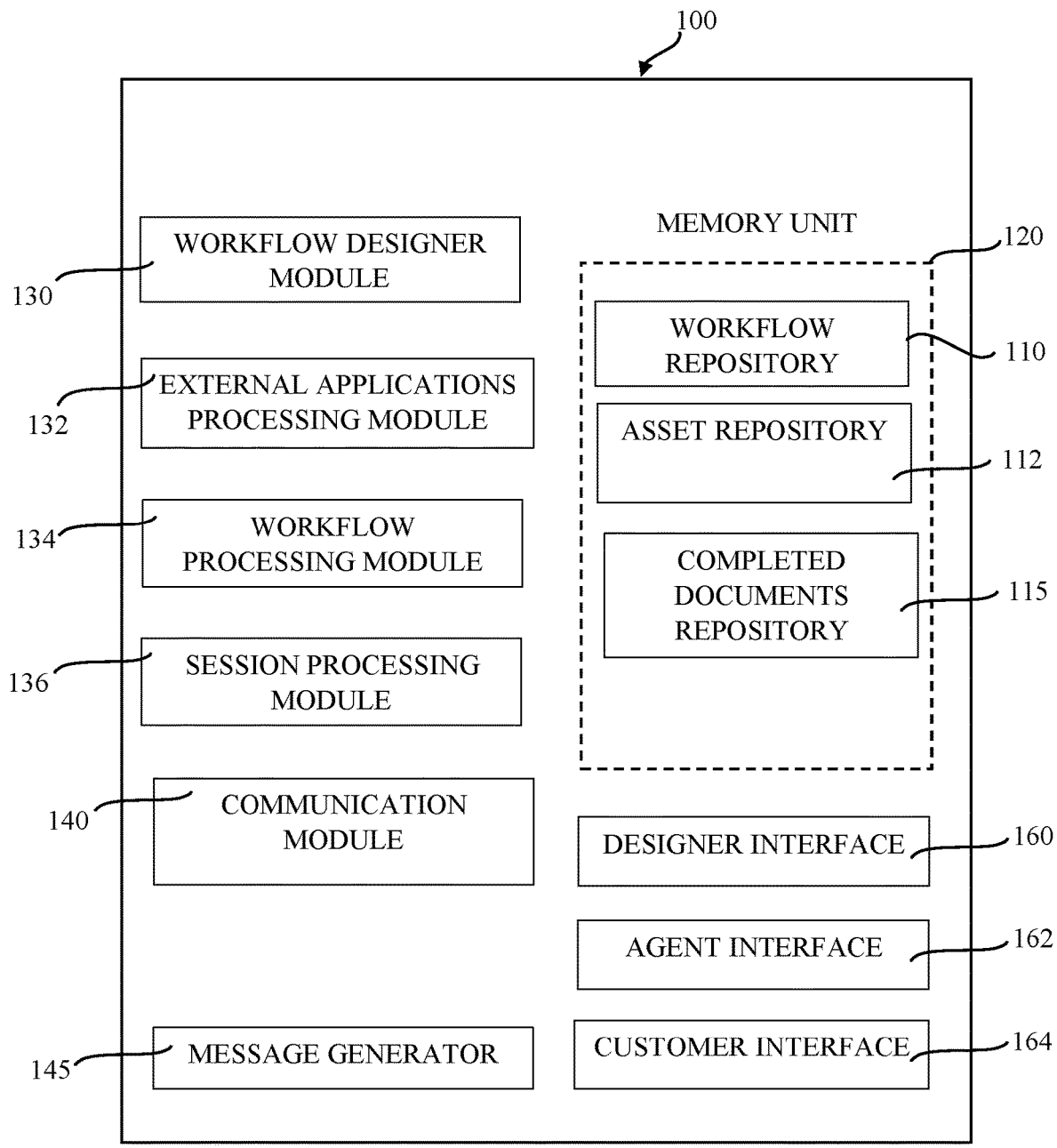
FIG. 1 shows a system for improving efficiency in a call center, according to exemplary embodiments of the invention.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

Embodiments of the invention include a system and method for improving efficiency in call centers. The system and method of the invention also enable call center managers to enforce business regulations and compliance requirement on the communication sessions exchanged between the call center representatives and the call center customers. One technical challenge solved by the invention is that the agents' requirements for short communication sessions lead to sales that fail to satisfy regulations. The regulations may be commercial, medical, legal and the like. When the sale fails to satisfy the regulations, the sale is not valid, and the commercial business has to allocate additional resources, such as another phone call, in order to make the sale valid and enjoy the sale's income. The invention discloses a system and method for verifying that the regulation is satisfied during the communication session in which the sale is accepted by the customer. This way, the entire sale cycle is completed as soon as possible, the commercial business can enjoy the additional income without delay, and no additional resources are required from the commercial business, hence the call center operates more efficiently and effectively.

The system disclosed herein may be part of a computerized system at a call center, or may be implemented as a server accessible and used by multiple call centers, each of the call centers may access the sections in the system that are relevant to the specific call center, according to permissions. The system comprises a set of business processes that are part of communication sessions. The business process may be sale of a device, upgrade of a device, upgrade of a service, termination of services, receipt of complaints and the like. The business process may be associated with a workflow that the agent or automated machine is required to follow. The workflow comprises exchange of information between the customer and the agent/machine during the communication session in order to end with a valid sale that satisfies regulations known to the call center personnel. The exchange of information may include name and date of birth from the customer's side, as well as credit card details, while the agent is required to send a predefined list of details of the purchased device and payment terms.

The call center personnel, such as business analyst, inputs the workflow into a user interface of the system. The call center personnel also inputs a list of regulations associated with each of the business processes. For example, in some US states, such as in California, a written consent of the customer, allowing the commercial business to represent him, is required. In some US states a consent is not required. Thus, for the processes in which the customer's consent is required, the system stores a business logic of requesting the customer's address and based on the address, sending the consent document to the customer's electronic device in order to collect an electronic signature. The customer's signature enables the system to advance to the subsequent step in the workflow. The information inputted by the call center personnel and/or information collected from the customer's electronic device is stored in a memory module of the system, as elaborated below.

The call center personnel may also input inter-relations between multiple workflows inputted into the system. For example, in case a customer wishing to buy a new device, such as a cellular phone, the agent offers a new service program, and if the customer is interested, the new service workflow is initiated while the new device workflow is still in progress. In some cases, the call center personnel also inputs multiple optional paths for a single workflow. Different paths may be selected and executed during the workflow, according to information collected by the system, from the agent, from the customer, from a third party, and a combination thereof. For example, in case the customer wishes to purchase an item using a loan, the system may use a loan-device path of the device workflow, which is different from a direct-device path of the device workflow. Each of the paths of the workflow may include sending documents to the customer's personal electronic device and receiving information from the customer, such as personal information, signatures and the like. The different paths, the steps associated with each path, and the regulatory requirements of each path are inputted into the system, for example by the call center personnel or by another person or automated computerized mechanism, such as artificial intelligence based software which extracts the requirements from a web-based resource.

The workflows inputted by the system may include exchange of information with third party computerized entities, such as web applications, servers, devices associated with other commercial businesses, messaging applications and the like. The information inputted into the system may include the information relevant to the third party computerized entities, such as IP address, contact details, email address, name of a person assigned to handle the business process with the commercial business, information required to be sent to the third party computerized entities, format of the information required to be sent to the third party computerized entities, security or communication requirements for exchange of information with the third party computerized entities and the like. The information relevant to the third party computerized entities may be stored in a memory module accessible to the system of the invention.

FIG. 1 shows a system for improving efficiency in a call center, according to exemplary embodiments of the invention.

The system 100 comprises a memory module 120 configured to store the information required to verify that the regulatory requirements are satisfied during the communication session between the customer and the call center agent, either a person or an automated machine. The memory module 120 and its sub-components may be stored in an electrical device such as a personal computer, server and the like, or at an online storage, or a combination thereof. The memory module 120 is communicating with other modules of the system 100, and stores information received from the other modules, according to predefined rules, events and preferences. The memory module 120 comprises a workflow repository 110 configured to store information relevant to the workflows managed by the system 100. The workflow repository 110 may comprise steps required for completion of the workflows performed by the call center. For example, a specific call center may have 10 different workflows configured to represent actual steps executed in order to complete 10 business processes of the call center. Each of the workflows has one or more steps inputted into the workflow repository 110 by personnel of the commercial business that runs the call center, or by an automated machine. In some exemplary cases, the workflow repository 110 assigns an identifier value to each of the workflows and the steps relevant for the call center. For example, workflow #1 includes steps #1-7, while workflow #2 includes steps #2 and 8-11. In some exemplary cases, the workflows may be completed in multiple different paths, as elaborated in FIG. 3. A path of the multiple different paths may be selected based on information collected from the customer, the call center agent, or a third party resource. The workflow repository 110 may also store the set of rules used to select the path from the multiple different paths.

The memory module 120 may also comprise an asset repository 112. The asset repository 112 is configured to store assets used by the system when enforcing regulation during a communication session with a personal electronic device owned or accessed by a person. The assets may be media files or links to URLs storing the assets. In addition, assets can also be defined as dynamic forms that collect information relevant to the workflow from the agent, customer or a third party resource. Also, an asset can be a dynamic document that is being generated and/or updated during the communication session based on the information collected by the customer, agent or third party resource. The term dynamic also refers to the system's capability to change the document's form, number and type of questions, and the like. Some of the assets in the asset repository 112 may be accessed by a limited number of personnel operating the system that communicates with the personal electronic device. The asset repository 112 is queried by the system, for example by the processing module 136, to provide the asset. Providing the asset may be storing the asset in a predefined memory address, sending the asset to a predefined address, such as sending the asset as a text message or as an image to a phone number and the like.

the memory module 120 may also comprise a completed documents repository 115 configured to store completed versions of documents that the agent and/or the customer executed during the communication session, for example documents that the customer has completed/approved/updated/signed. In some exemplary cases, the documents in the completed documents repository 115 may have an identifier, for example a numeric ID value, and be associated with a specific customer of the call center, as well as a specific communication session between the call center and the customer's personal electronic device.

The system 100 may also comprise a designer interface 160 configured to enable a designer of the system to input information into the system. The designer interface 160 may be connected to a personal device used by the designer, such as a phone, laptop, tablet, personal computer and the like. The designer interface 160 enables the designer to input workflows, regulatory requirements for steps in the workflows, assets required for the workflow, multiple optional paths for the workflows, a list of permissions for the steps and the like.

The system 100 may also comprise an agent interface 162 configured to enable an agent administrating the communication session on behalf of the system to input information into the system. Such information may be filled into predefined fields in the agent interface 162, such as multiple answers from which the agent is required to select. The agent may input information into the agent interface 162 during or after the communication session with the personal electronic device accessed by the customer. The agent may input a command into the agent interface 162 to send visual content to the personal electronic device.

The system 100 may also comprise a customer interface 164 configured to receive information from the personal electronic device accessed by the customer. Such information may be feedback confirmation concerning the visual content sent to the personal electronic device. The customer interface 164 may be a client software application operating on the personal electronic device accessed by the customer, such as a browser, native messaging application or a dedicated application. The client software application may operate on a smartphone, cellular phone, tablet computer, laptop, personal computer and the like.

The system 100 may also comprise a workflow designer module 130 configured to enable preparing workflows into the system. The workflows may comprise multiple steps, regulatory requirements for the steps if any, assets required for the steps, messages required to conform to the regulatory requirements, rules and conditions, functions, durations required to complete phases in the workflow, multiple paths for the workflow and the like.

The system 100 may also comprise an external applications processing module 132 configured to process and manage communicating with third party entities. Such third party entities may be a supplier of physical devices sold by the agent on behalf of the system during the communication session, financial institute such as a bank or credit card company to receive the customer's credit rank, a data security service that secures data before sent to the personal electronic device and the like. The communicating with third party entities may take place during or after the communication session with the personal electronic device.

The system 100 may also comprise a workflow processing module 134 configured to process and manage the workflow. The workflow processing module 134 may verify that the information sent to the personal electronic device conforms to regulatory requirements stored in the workflow repository 110. The workflow processing module 134 may be configured to enable or disable advancement of the workflow to the subsequent step based on whether or not a predefined rule of the current step have been satisfied. The predefined rules may be inputted by a person operating the system or the call center, or be automatically extracted from another electrical device or an internet address. The predefined rule may result from a regulatory requirement. The workflow processing module 134 may receive messages received from the personal electronic device and compare the messages to a predefined set of rules to determine whether the messages satisfy the regulatory requirements or not. For example, the regulatory requirement may be to receive a signature from the personal electronic device while the personal electronic device sent only a "read confirmation" about a visual content, not a signature. As a result, the workflow processing module 134 will disable advancement to the subsequent step. Such disable may be implemented by displaying a message on the display device used by the agent administrating the communication session, by changing a definition in the system, by sending a message to the personal electronic device and the like.

The system 100 may also comprise a session processing module 136 configured to manage the session. The system 100 may execute several communication sessions concurrently, each of the several communication sessions may be managed by another agent of the call center and/or the commercial business that uses the call center's services. The session processing module 136 is configured to manage the session, send a command to a communication module 140 of the system 100 as to which documents to send, send a command to a message generator 145 of the system 100 as to which documents to generate and the like.

The system 100 may also comprise a communication module 140 configured to exchange information with the personal electronic device. The communication module 140 may comprise an internet gateway in case the information is exchanged via the internet. The communication module 140 may comprise antennas, cables, modems and other physical communication mechanisms configured to receive and send signals configured to be received at another device.

The system 100 may also comprise a message generator 145 configured to generate messages to be sent to the personal electronic device during the communication session in which the workflow is executed. The message generator 145 may have one or more message templates stored in the memory module 120 and add information related to the specific instance of the workflow, which is implemented in a specific communication session. The specific instance may define information related to the customer operating the personal electronic device, details about the service or goods to be provided to the customer and the like. Some of the information used by the message generator 145 to generate the message may be extracted from the workflow repository 110.

Figure 2:
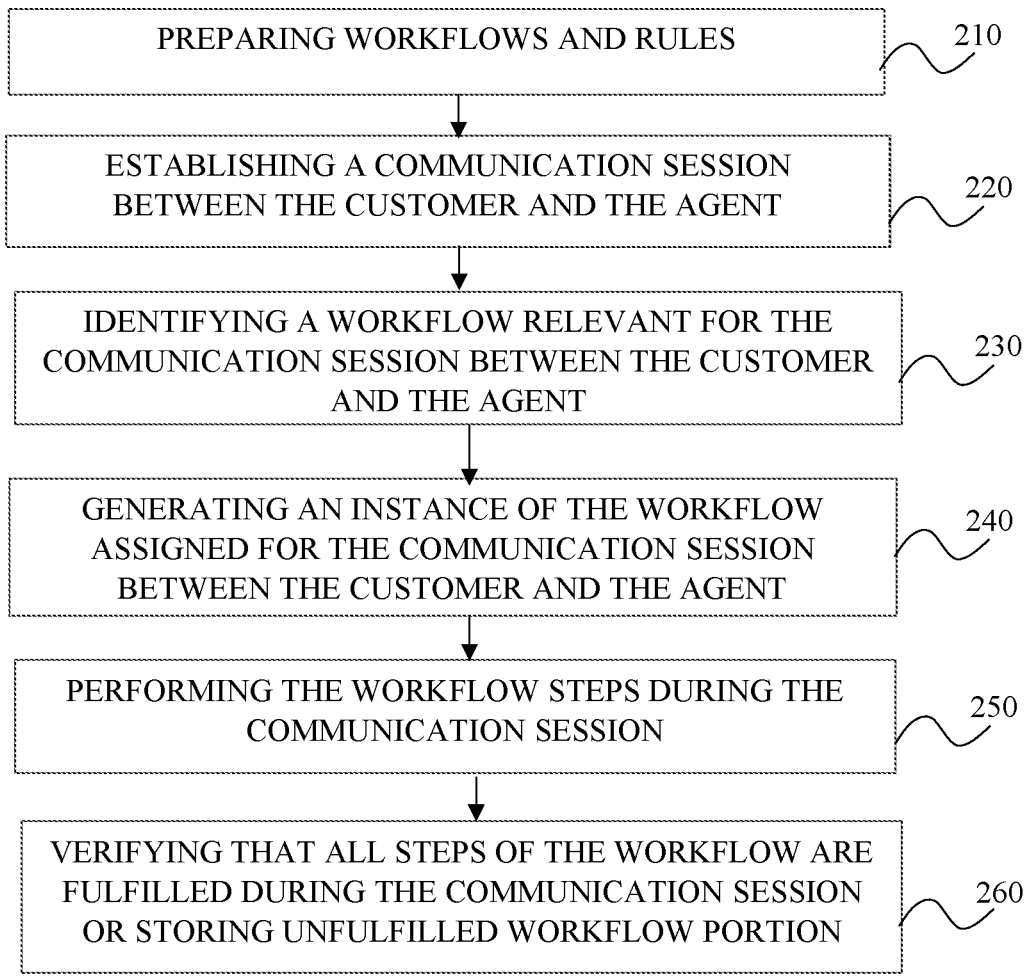
FIG. 2 shows a method for verifying that regulatory requirements are satisfied during a communication session handled by a call center, according to exemplary embodiments of the invention.

FIG. 2 shows a method for verifying that regulatory requirements are satisfied during a communication session handled by a call center, according to exemplary embodiments of the invention.

Step 210 discloses preparing workflows and rules. Preparation of the workflows may be performed by receiving information from a person who creates the workflows based on business logics of a commercial business. The rules may be created based on regulatory requirements known to the person who prepares the workflows. The rules may be specific to a step in the workflow. For example, the rule may dictate that regulatory requirements of a step are satisfied only after receiving predefined information, such as the customer's consent on a specific service, or to have his/her approval on terms and conditions concerning purchase of a device or a service, or to collect his/her signature on a loan agreement. such information may be received via a text message sent from the customer's personal electronic device. Another rule may dictate that a step is fulfilled only upon access of the personal electronic device to a link on the internet and selecting an option in the link. The workflows and rules related to the workflows may be stored in the system's memory module or in a memory module accessed by the system.

Step 220 discloses establishing a communication session between the customer and the agent. The communication session may comprise exchange of information between at least two of the call center, the system of the invention and the customer's personal device. The communication session sharing a link via a URL with the customer's personal device. The communication session may be an audio communication session, video communication session, textual communication session and a combination of the above.

Step 230 discloses identifying a workflow relevant for the session between the customer and the agent. The workflow may be identified by the agent administrating the communication session on behalf of the commercial business versus the customer, based on the information exchanged during or prior to the communication session. In some cases, the system may automatically identify the workflow based on analysis of audio and text received from the personal electronic device during the communication session. When the agent is not sure of the workflow, a list of optional workflows may be suggested by the system.

Step 240 discloses generating an instance of the workflow assigned for the session between the customer and the agent. The instance comprises an identifier of the customer and additional information required to fulfill the workflow, such as identifier of the personal electronic device, commencement time of the instance and the like. Exchange of messages with the personal electronic device is associated with the specific instance with the specific customer, while the workflow forms the rules to be followed in order to achieve the business goals of the commercial business during the communication session with the customer via the personal electronic device. The instance comprises the visual content sent to the personal electronic device, such as text messages, completed documents, internet links and the like, and the customer's feedback as received from the personal electronic device.

Step 250 discloses performing the workflow steps during the session. The steps are performed by exchanging information between the system and the personal electronic device, according to information and commands inputted by the agent and the customer, respectively. For example, the system may send a form to the personal electronic device, indicating terms and liability of the commercial business that employs the agent. The customer may input a message into the personal electronic device indicating that the customer read the form, understands and agrees to the terms and conditions. Then, the system may send to the personal electronic device optional delivery times for the customer to select a desired delivery time. The customer then sends the desired time. The customer may select the desired time over a link or a dedicated menu formed as a calendar.

Step 260 discloses verifying that all steps of the workflow are fulfilled during the session or storing unfulfilled workflow portion. During each step in the workflow, the system monitors the information exchanged with the personal electronic device. The system compares that the information sent to the personal electronic device according to the agent's commands conforms to the regulatory requirements. In case the regulatory requirements are satisfied, the system advance to the next step in the workflow. Advancement may include showing a screen having information of the subsequent step to the call center representative. Advancement may include automatically sending a message to the customer's personal electronic device, based on the rules and properties of the subsequent step. The messages sent to the customer's personal electronic device may include text, files, links to information stored in a specific URL, documents, payment requests, verification requests and the like. The system also updates the instance that the communication session with the customer reached the subsequent step, in case the communication session is suddenly interrupted. In case the regulatory requirements are not satisfied, the system disables the agent from advancing to the next step in the workflow. When all the steps are fulfilled, the system defines the instance with the specific customer as a fulfilled workflow.

In case the workflow was not fulfilled during the communication session, the system registers the step in the workflow in which the instance was stopped at. Hence, when the session with the same customer is resumed, for example, after the next time the customer is identified before the system, the workflow is resumed in the step in which the last session ended. The workflow may resume automatically, as the system operates versus the customer, without any intervention from the call center representative.

Figure 3:
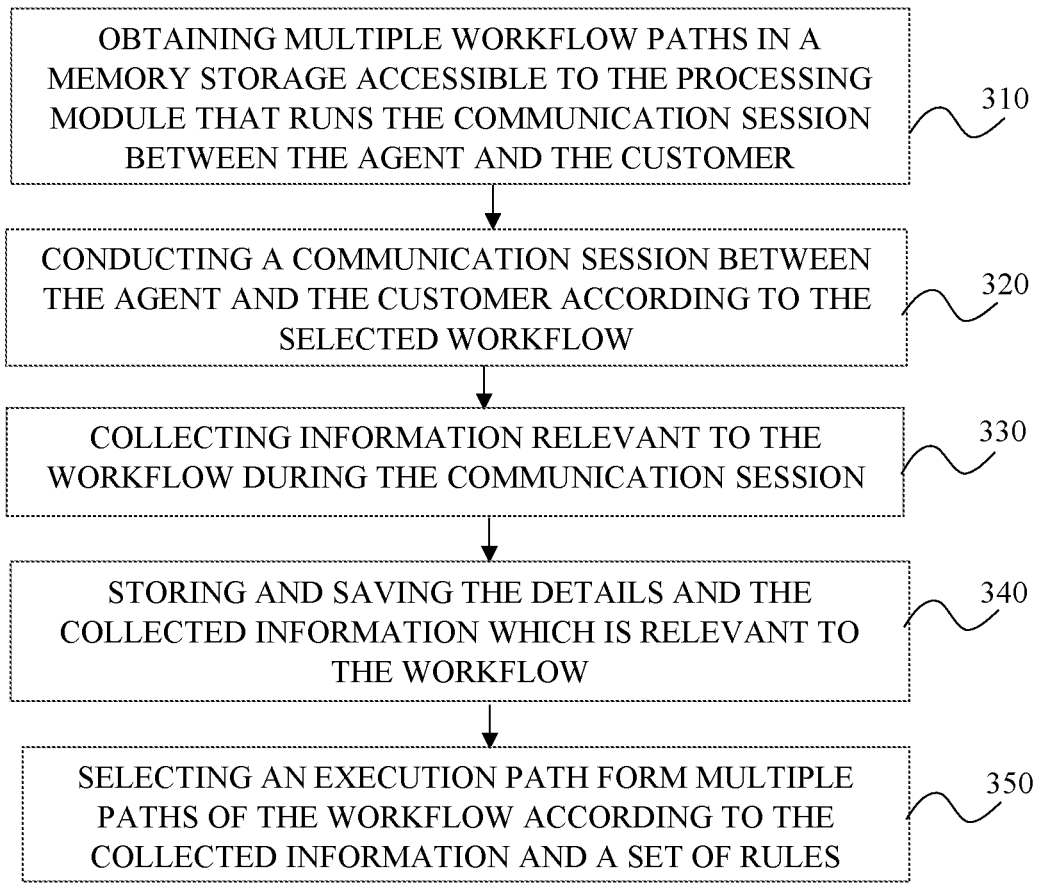
FIG. 3 shows a method for modifying a specific instance of the workflow according to information collected during the communication session and a set of rules, according to exemplary embodiments of the invention.

FIG. 3 shows a method for modifying a specific instance of the workflow according to information collected during the communication session and a set of rules, according to exemplary embodiments of the invention.

Step 310 discloses obtaining multiple workflow paths in a memory storage accessible to the session processing module that runs the communication session between the agent and the customer. The multiple workflow paths may define multiple options to execute the workflow. For example, different workflow paths may define different payment methods, for example via credit, debit, loan and a single wire transfer. In some cases, different workflow paths may define different permissions required in order to execute the workflow, for example in case the customer is not allowed to independently acquire goods or services and needs an executer, guardian, custodian, trustee and the like to authorize the purchase. Another example of multiple paths may concern the customer's physical address—if the customer's mailing address is in California, then a consent document will be automatically added to the group of documents that the customer needs to sign. While if the customer's address is not in California then the consent document is not generated nor sent. The system may store a plurality of different workflows, some of the workflows may have a single path, some workflows may have 3-4 optional paths and some workflows may have 7-8 optional paths.

Different workflow paths are executed using different steps. The steps may be stored along with steps' identifiers. For example, path number 2 executed for workflow number 32 may utilize steps number 1, 7 and 12, while path number 3 executed for workflow number 32 may utilize steps number 1, 8, 12 and 13. Some of the steps may be associated with regulatory requirements as defined herein.

Step 320 discloses conducting a communication session between the system and the personal electronic device according to a selected workflow. The workflow may be selected by the agent from a menu, or may be automatically determined by the system in accordance with text or video collected during the communication session.

Step 330 discloses collecting information relevant to the workflow during the communication session. The information may be the customer's age, address, credit rank, legal status, prior purchases at the commercial business and the like. The information may be inputted by the customer into the personal electronic device and then sent to the system. The information may be provided from a third party entity in response to a request sent from the system. For example, in case the third party entity sends the system of the invention the customer's details as they are stored in the third party entity. The third party entity can also send the price of the purchased goods/service.

Step 340 discloses storing and saving the collected information which is relevant to the workflow. The collected information may be stored in a memory module of the system, or in a memory module accessible to the system.

Step 350 discloses selecting an execution path form multiple paths of the workflow according to the collected information and a set of rules. The set of rules may be stored in a memory module of the system, or in a memory module accessible to the system. The set of rules may define the circumstances in which each of the optional paths is to be selected. For example, if the communication session is longer than 30 minutes, choose path number 5, and if the customer chooses to purchase two or more items during a single communication session and has not purchased any item in the year prior to the communication session, choose path number 18.

Figure 4:
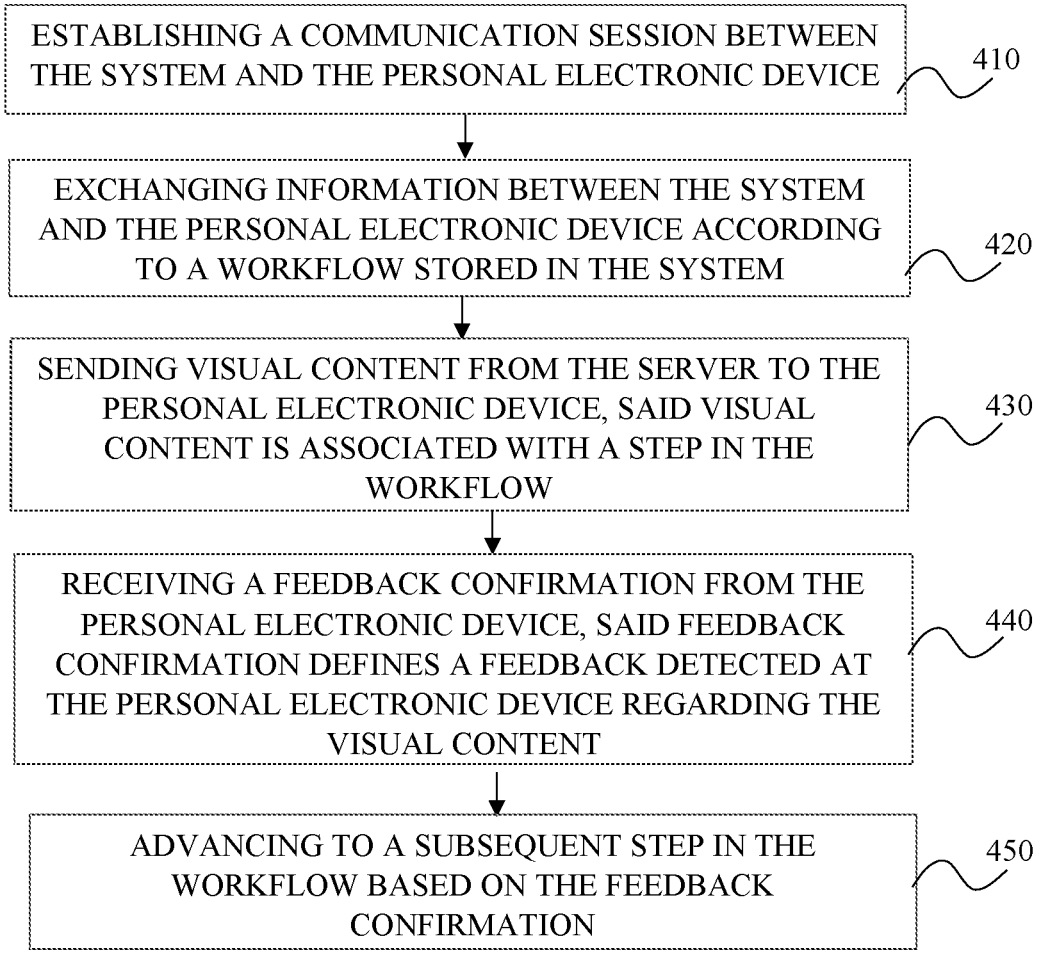
FIG. 4 shows a method of exchanging information between a customer and an agent of the call center for verifying that regulatory requirements are satisfied, according to exemplary embodiments of the invention; and, FIG. 5 shows a schematic representation of exchange of information between a personal electronic device operated by a customer and the system operated by an agent of the call center, according to exemplary embodiments of the invention.

FIG. 4 shows a method of exchanging information between a customer and an agent of the call center for verifying that regulatory requirements are satisfied, according to exemplary embodiments of the invention.

Step 410 discloses establishing a communication session between the system and the personal electronic device. The communication session includes an identifier of the customer's personal electronic device, for example an IP address thereof. The communication session may be initiated in response to a command or approval from the call center representative.

Step 420 discloses exchanging information between the system and the personal electronic device according to a workflow stored in the system.

Step 430 discloses sending visual content from the server to the personal electronic device, said visual content is associated with a step in the workflow. The visual content comprises textual messages, images, internet links and the like. The link may be unique to the instance with the personal electronic device.

Step 440 discloses receiving a feedback confirmation from the personal electronic device, said feedback confirmation defines a feedback detected at the personal electronic device regarding the visual content sent to the personal electronic device by the system. The feedback may be confirmation that the customer read the entire visual content, a predefined portion of the visual content, spent a predefined time reading the visual content and the like. The feedback may comprise confirmation that the personal electronic device accessed an internet link included in the visual content. The feedback may comprise a textual message inputted by the customer operating the personal electronic device. The textual message may comprise an equivalent of the customer's signature, a textual confirmation message inputted by the customer, a selection inputted by the customer and the like.

Step 450 discloses advancing to a subsequent step in the workflow based on the feedback confirmation. Advancing to the subsequent step may be implemented by displaying content of the subsequent step in the workflow or by sending information to the customer's personal electronic device that is included in the information sent during the subsequent step. In some cases, advancing to the subsequent step may be implemented by changing a data field in a memory address accessible to the system. When the system determines to advance to the subsequent step, the system may access a memory address relevant to the subsequent step, and in case the predefined rules, for example regulatory requirements, for the current step are satisfied, the value in the memory address indicates to the system that it can advance to the subsequent step. In some cases, the information related to the subsequent step may be encrypted or otherwise protected using information security mechanism or algorithm. In such a case, information used to decrypt the information related to the subsequent step is accessible to the system in case the regulatory requirements for the current step are satisfied.

Figure 5:
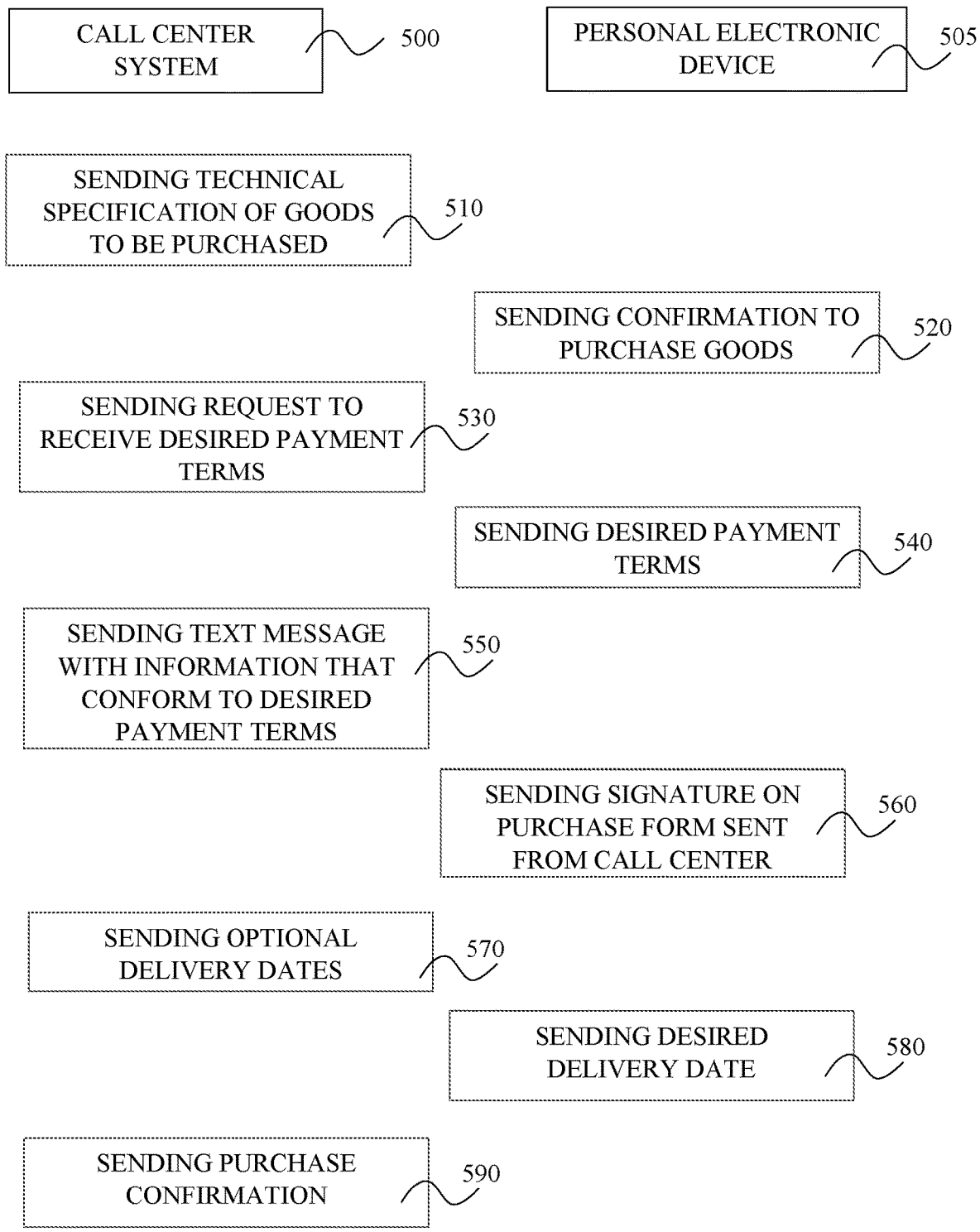

FIG. 5 shows a schematic representation of exchange of information between a personal electronic device operated by a customer and the system operated by an agent of the call center, according to exemplary embodiments of the invention. The system may operate independently, or in response to input from the agent. For example, the agent may identify the workflow for a specific communication session, and after the system receives the workflow identifier from the agent, the communication session proceeds automatically by the system that exchanges information with the customer's personal electronic device. In some other cases, the system also identifies the workflow to be selected, for example by text analysis, audio analysis, by receiving user's selection in a dedicated menu and the like. The system 500 sends information to the personal electronic device 505 via text messages, images, internet links and other visual content. The communication session shown below is exemplary only and shows an optional path to execute a workflow in which the customer operating the personal electronic device 505 wishes to purchase goods and/or services from a commercial business that utilizes a call center than runs the system 500. The system 500 may send messages generated by the message generator described above, and sent via the communication module.

In step 510, the system 500 sends technical specification of goods to be purchased to the personal electronic device 505. The technical specification may be stored in a memory module of the system 500 or in an internet link.

In step 520, the electronic device 505 sends confirmation to purchase goods to the system 500. Such confirmation may be implemented by inputting a textual message, by pressing a hyperlink in the message received from the system 500 or in any other manner desired by a person skilled in the art.

In step 530, the system 500 sends request to receive desired payment terms to the personal electronic device 505. The request may be a text message having multiple optional payment terms and a menu from which the customer operating the electronic device 505 may select the desired payment terms.

In step 540, the electronic device 505 sends desired payment terms to the system 500. The desired payment terms may be sent via an internet link or via a text message.

In step 550, the system 500 sends a text message with information that conform to desired payment terms to the personal electronic device 505. In step 560, the electronic device 505 sends a signature on a purchase form sent from call center to the system 500.

In step 570, the system 500 sends optional delivery dates to the personal electronic device 505. The optional delivery dates may be sent as a link to a calendar, a text message, an image and a combination of the above. In some exemplary cases, the optional delivery dates are sent to the personal electronic device 505 only in case the signature on the purchase form conforms to a predefined rule in the system 500, said rule is based on regulatory requirements.

In step 580, the electronic device 505 sends desired delivery date to the system 500. In step 590, the system 500 sends sending purchase confirmation to the personal electronic device 505. The purchase confirmation may comprise the details agreed upon by the customer, for example the goods to be purchased, payment terms, shipping method, delivery date and the like.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

It should be understood that the above description is merely exemplary and that there are various embodiments of the invention that may be devised, mutatis mutandis, and that the features described in the above-described embodiments, and those not described herein, may be used separately or in any suitable combination; and the invention can be devised in accordance with embodiments not necessarily described above.

The invention claimed is:

1. A method for conducting a communication session between a personal electronic device and a system operated by a call center agent, comprising:
    establishing a communication session between the system and the personal electronic device;
    exchanging information between the system and the personal electronic device according to a workflow stored in the system;
    sending visual content from the server to the personal electronic device, said visual content is associated with a step in the workflow;
    receiving a feedback confirmation from the personal electronic device, said feedback confirmation defines a feedback detected at the personal electronic device regarding the visual content;
    advancing to a subsequent step in the workflow based on the feedback confirmation.

2. The method of claim 1, wherein advancing to a subsequent step comprises changing a data field definition in the system.

3. The method of claim 1, wherein the visual content comprises text and the feedback confirmation comprises reading confirmation of at least a predefined portion of the text.

4. The method of claim 1, wherein sending the visual content to an address defined by a user of the personal electronic device.

5. The method of claim 1, wherein the visual content comprises a text message displayed on a messaging application installed in the personal electronic device.

6. The method of claim 1, wherein the visual content comprises an image opened in response to an action performed by a user of the personal electronic device.

7. The method of claim 1, further comprises sending an internet link to the personal electronic device along with the visual content.

8. The method of claim 7, wherein the feedback confirmation is inputted by a user of the personal electronic device into the internet link.

9. The method of claim 7, wherein the feedback confirmation is identification of the personal electronic device accessing the internet link.

10. The method of claim 1, further comprises terminating the communication session between the system and the personal electronic device and storing a specific step in the workflow in which the communication session was terminated and resuming another communication session between the system and the personal electronic device in the specific step.

11. The method of claim 1, further comprises generating an instance of the workflow assigned for the communication session between the system and the personal electronic device.

12. The method of claim 1, further comprises collecting information relevant to the workflow during the session and selecting an execution path from multiple paths of the workflow according to the collected information and a set of rules.

* * * * *